United States Patent [19]

Tomasini et al.

[11] Patent Number: 5,337,355
[45] Date of Patent: Aug. 9, 1994

[54] SUPPLY CIRCUIT DEVICE FOR A USER'S TELEPHONE CIRCUIT, HAVING A LOW VOLTAGE LOSS

[75] Inventors: Luciano Tomasini, Monza; Rinaldo Castello, Arcore, both of Italy

[73] Assignee: SGS-Thomson Microelectronics S.r.l., Milan, Italy

[21] Appl. No.: 991,564

[22] Filed: Dec. 16, 1992

[51] Int. Cl.$^5$ .................. H04M 19/00; H04M 1/00
[52] U.S. Cl. .................. 379/413; 379/324; 379/399; 379/387
[58] Field of Search ............ 379/413, 324, 399, 400, 379/401, 387

[56] References Cited

U.S. PATENT DOCUMENTS

| 4,628,249 | 12/1986 | Ikefuji et al. | 323/315 |
| 4,639,551 | 1/1987 | Kaire | 379/413 X |
| 4,811,391 | 3/1989 | Van Dongen et al. | 379/387 |

FOREIGN PATENT DOCUMENTS

| 2538661 | 6/1984 | France | H04Q 1/28 |
| 2549667 | 1/1985 | France | H04M 19/00 |

Primary Examiner—James L. Dwyer
Assistant Examiner—Paul A. Fournier
Attorney, Agent, or Firm—Seed and Berry

[57] ABSTRACT

A circuit is described which comprises an operational amplifier, two resistors connected between the telephone line and the inputs of the amplifier, a capacitor which is charged via a first bipolar transistor controlled by the amplifier via a first FET transistor, a second bipolar transistor in parallel to the connection of the first transistor and the capacitor, a second FET transistor, identical to the first and having its source and gate terminals connected to the corresponding terminals of the first, and two current generators connected to the drain terminals respectively of the first and the second FET transistor and to the bases, respectively, of the first and second bipolar transistor. The currents of the two generators and the other parameters of the circuit are such as to hold the first and second bipolar transistors in a conductive and a switched off state respectively, except when the line voltage fails below a minimum predetermined value; in which case the first and second transistors commute to the switched off and conductive states respectively. The circuit has a lower "voltage loss" than known circuits.

20 Claims, 1 Drawing Sheet

SUPPLY CIRCUIT DEVICE FOR A USER'S TELEPHONE CIRCUIT, HAVING A LOW VOLTAGE LOSS

TECHNICAL FIELD

The present invention relates to the electrical supply of user's telephone circuits and, more particularly, to a circuit device for deriving a supply voltage from the user's line.

BACKGROUND OF THE INVENTION

As is known, the speech circuit of an electronic telephone apparatus is supplied with electrical energy provided on the user's line from the so-called central battery. A suitable circuit is arranged to extract the necessary electrical energy from the line, to provide it at a stabilized voltage to the speech circuit to be supplied.

A known circuit of this type, which is shown in the block diagram of FIG. 1 of the drawing accompanying the present specification, comprises a capacitor C which is connected on one side to one wire of the line loop, indicated with the earth symbol, and, on the other, to the other wire L of line loop, via the series connection of a resistor R2, the collector-emitter path of a transistor T and a diode D connected in a forward biased sense. In reality, as is known, both the earth terminal and the wire L are connected to the wires of the line loop by other components, not shown in order not to excessively complicate the drawing. The transistor T is held in conduction in the saturation region by the output of an operational amplifier A the inverting input terminal of which is connected to the connection node between the resistor R2 and the emitter of the transistor T, and the non-inverting input of which is also connected to the line L via a second resistor R1. The connection between the emitter of transistor T and the inverting input of the operational amplifier A constitutes a negative feedback loop which tends to maintain the voltage drops on the resistors R1 and R2 and therefore the voltages on the input terminals of the amplifier equal to one another. Between the non-inverting input of the amplifier and earth there is shown a current generator G to indicate that a control current Ic, proportional to the current flowing in the line and derived from known means, not shown, is applied to the non-inverting input of the amplifier A. A regulation circuit SR, connecting between the collector of the transistor T and earth, acts to stabilize the voltage VS across the capacitor C. The voltage Vs is applied to the speech circuit, not shown, in order to constitute its supply.

The maximum obtainable value for the stabilized voltage obviously depends primarily on the value of the voltage on the line at the connection point with the user's apparatus, which is given by the voltage of the central battery reduced by the voltage drop on the line due to the resistance of the line itself and by the so-called "voltage loss" that is to say the voltage drop along the path between this connection point and the effective stabilized voltage take-off point.

In the design of telephone networks it is necessary to arrange that the user's line does not reach a length such that the voltage at the connection points to the user's telephone apparatus is less than a minimum predetermined value which still allows the electrical energy to be taken from the line at a sufficiently high voltage to supply the speech circuit.

The stabilized supply voltage VS is given by the DC voltage VL of the line at the connection point of the user's apparatus reduced by the "voltage loss". For the above described known circuit the "voltage loss" is equal to the sum of the voltage drop VR1 on the resistor R2, the collector-emitter voltage $V_{CEsat}$ of the transistor T in saturation and the voltage VD of the forward biased diode D.

The stabilized voltage is, therefore:

$$VS = VL - (VR2 + V_{CEsat} + VD)$$

Since, typically, $V_{CEsat}$ and VD are both about 0.3 V and, at the usually operating currents, VR2 for a resistor of 10 ohms, is about 0.1 V the overall voltage drop is about 0.7 V. Now, the stabilized voltage necessary for supplying a normal speech circuit is about 3 V, and therefore the voltage at the connection point of the resistors R1 and R2 to the line cannot be less than 3.7 V. It is obvious that this puts a limit on the maximum length of the user's line.

SUMMARY OF THE INVENTION

The general object of the present invention is to move this limit in such a way as to allow the use of longer user lines.

More particularly, the object of the present invention is to provide a circuit arrangement for supplying a speech circuit of a user's telephone apparatus which has an extremely low voltage loss.

This object is achieved by the circuit arrangement defined and characterized in the claims which conclude the present description.

BRIEF DESCRIPTION OF THE DRAWINGS

The invention will be better understood from the following detailed description of a simplified embodiment which is therefore in no way limitative, given in relation to the drawing, in which.

DETAILED DESCRIPTION OF THE INVENTION

Figure 1:
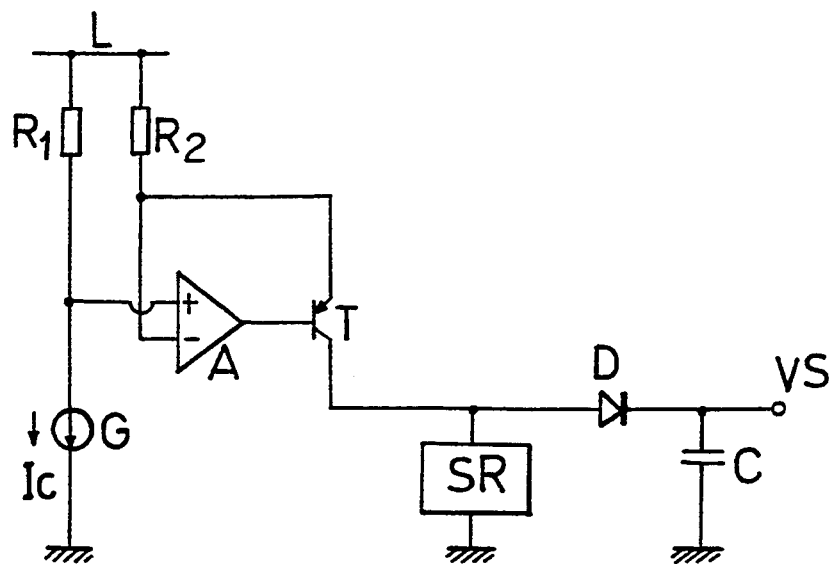
FIG. 1 represents a known circuit described above.
Figure 2:
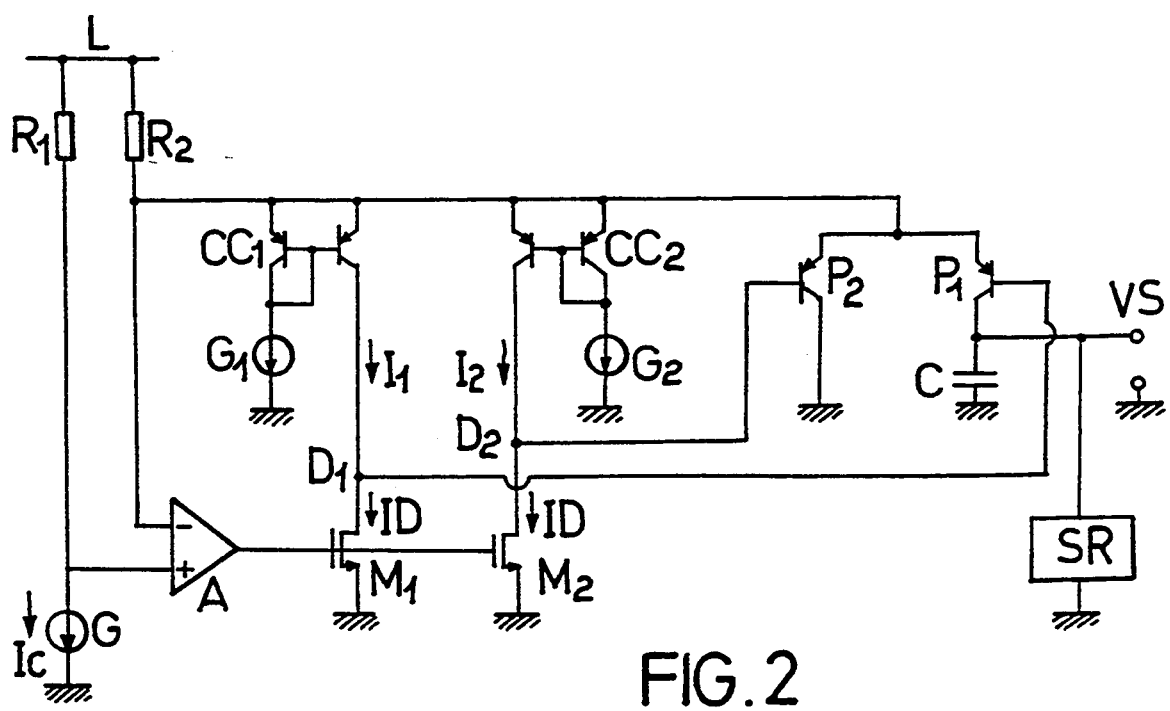
FIG. 2 represents a circuit arrangement according to the invention.

In FIG. 2, where the same symbols as those used in FIG. 1 refer to equivalent components or quantities, the wires of the line loop are connected, in this case too, by means of the usual coupling devices, one to the point indicated L and the other to the common terminal represented by the earth symbol. Two resistors R1 and R2 are connected each by one terminal to the point L and by the other to the non-inverting and inverting terminals respectively of an operational amplifier indicated A. The resistor R1 is also connected to a generator G which provides a control current Ic as for the known circuit of FIG. 1. The output of the operational amplifier A is connected to the gate terminals of two identical FET transistors, that is to say field-effect transistors, M1 and M2. These have their source terminals connected to earth and their drain terminals indicated D1 and D2 respectively, connected each to a current generator circuit arrangement CC1 and CC2 respectively, and to the base of a bipolar transistor, respectively P1 and P2. The two transistors P1 and P2 have their emitter terminals connected together to the circuit node between the resistor R2 and the inverting input of the amplifier A and their collector terminals connected, respectively, to one terminal of a capacitor C and to earth. The other terminal of the capacitor is also connected to earth. It is noted that, advantageously, each of the transistors P1 and P2 can be replaced by a pair of transistors connected in a Darlington configuration and each of the transistors M1 and M2 can be replaced by two transistors connected together in cascode, without changing the circuit or its principle of operation. Across the terminals of the capacitor C, which constitute the output terminals of the circuit arrangement, from which a stabilized voltage VS is taken, is connected a branch voltage stabilizer SR.

The circuit arrangements CC1 and CC2 are constituted by two pairs of bipolar transistors connected in a current mirror configuration and having one branch connected to a current generator, respectively G1 and G2, and the other branch to the drain terminal D1, D2 of the respective transistor M1, M2.

The operation of the circuit device of FIG. 2 is now considered.

The transistors M1 and M2, being equal and having their source and gate terminals in common, are always traversed by the same currents. The two current mirrors CC1 and CC2 have a current gain equal to one, that is to say they produce an output current I1 and I2 equal to the reference (G1 and G2 respectively), if the respective output transistors are in their linear region that is to say if the voltage at the nodes D1 and D2 is at least $V_{CEsat}$ lower than the voltage of the emitters of P1 and P2. The current G2 is chosen to be greater than the sum of G1 plus the maximum base current of P1. Since M1 and M2 must carry the same current the node D2 must carry a voltage sufficiently high with respect to earth to bring the output transistor of the mirror CC2 into saturation. In these conditions the transistor P2 is switched off. At the same time the node D1 must carry a sufficiently low voltage to bring P1 into conduction. In particular, the circuit parameters are chosen in such a way that, when the line voltage in the absence of a signal is high, that is to say when the user's line is relatively short, P1 is in a linear zone and, when the line voltage in the absence of a signal is the minimum allowed, that is to say when the line is very long, P1 is polarized in the saturation region. Clearly, in each case, the capacitor C can be charged through the transistor P1 with a current gIc where g indicates the ratio between R1 and R2, typically lying between 60 and 200.

While the line voltage or, better, the voltage between the point L and earth, is greater than or equal to the sum of the stabilized voltage VS, the voltage $V_{CEsat}$ of P1 and the drop on R2, VR2, P1 remains in conduction and P2 remains switched off.

During a negative half-wave of an alternating current signal the emitter-collector voltage of P1 falls. If the negative half wave is sufficiently great this voltage can fall to zero and then become negative. The reduction in the emitter-collector voltage produces a reduction in the collector current of P1. Consequently, the drop VR2 on the resistor R2 falls, causing a corresponding increase in the output voltage of the operational amplifier A and an increase in the equal drain currents $I_D$ of M1 and M2. When the drain current $I_D$ of M2 is equal to I2, which is greater than I1, the transistor P2 begins to conduct because the voltage on drain D2 of M2 falls to cause forward conduction of its base-emitter junction, whilst the transistor P1 remains turned off. This situation is maintained for the whole of the time in which the negative half-wave maintains the voltage VL lower than the above mentioned sum.

As soon as the voltage VL rises above this value the voltage drop VR2 reduces, P1 commences to conduct, causing an increase in the voltage drop across R2. The greater drop on VR2 also causes a reduction in the output voltage of the operational amplifier A and therefore a reduction in the drain currents $I_D$ of M1 and M2. As soon as the current $I_D$ becomes less than the current I2 the voltage on D2 returns to be very close to the voltage of the emitter of P2 so that this latter transistor ceases to conduct. The initial conditions are thus resumed.

The voltage across the terminals of capacitor C stabilized by the regulator SR is applied to the speech circuit.

It is clear how the circuit arrangement described above makes it possible to achieve the object of the invention. In fact, the "voltage loss" is limited to the sum of the voltage drop on the resistor R2 and the voltage $V_{CEsat}$ of the transistor P1, that is to say the "voltage loss" reduced by a voltage drop on a forward biased diode.

With a suitable design of the generators CC1 and CC2, that is to say by causing that the current I2 is very much greater than the current I1, it is possible to set a heavy saturation of P1 and therefore a $V_{CEsat}$ even smaller. In summary, then, in equal conditions there is obtained a lower "voltage loss" with respect to the known art of 300-500 mV, which makes it possible to utilize considerably longer user lines.

From the single embodiment of the invention which has been illustrated and described it is clear that many variations and modifications are possible within the ambit of the same inventive concept. For example, rather than utilizing identical transistors M1 and M2 and different currents I1 and I2 it would be possible to utilize structurally different transistors M1 and M2 and identical currents I1 and I2 as long as the operating characteristics of the two transistors are such as to control the transistors P1 and P2 in the same way as described above; moreover, in place of the field-effect transistors M1 and M2 it would be possible to utilize transistor devices or equivalent circuit structures formed by bipolar transistors and, similarly, in place of the transistors, or Darlington pairs P1 and P2 it would be possible to utilize transistor arrangements or equivalent circuit structures formed by field-effect transistors.

We claim:

1. A circuit arrangement for drawing a supply voltage from a user's telephone line, particularly for supplying a speech circuit, comprising:

an operational amplifier having an output, an inverting input and a non-inverting input, resistive means between a wire of the telephone line and the inputs of the operational amplifier, negative feedback means between the output of the operational amplifier and a circuit node connected to one of the inputs of the operational amplifier, coupling means adapted to apply to the other of the inputs of the operational amplifier a current proportional to the line current, a capacitor connected on one side to a common terminal of the circuit arrangement which is connected to the other wire of the telephone line and, on the other side, to an output terminal of the circuit arrangement, which is connected to the said circuit node by means of first circuit means controlled by the operational amplifier, characterized in that such first circuit means include a first transistor device having a conduction path connected in series with the capacitor and a control terminal, and in that it further comprises:

a second transistor device having a respective conduction path connected in parallel to the series connection of the first transistor device with the capacitor, and a respective control terminal, and third and fourth transistor devices each having a conduction path connected, on one side to the common terminal and, on the other side to the circuit node via first and second current generators respectively, and a control terminal, these control terminals being connected together to the output of the operational amplifier;

the node between the third transistor device and the respective first current generator being connected to the control terminal of the first transistor device and the node between the fourth transistor device and the respective second current generator being connected to the control terminal of the second transistor device, and the circuit parameters being chosen in such a way that the first and the second transistor device are, respectively, in a conduction state and a switched-off state except when the line voltage falls below a minimum predetermined value, in which case the first transistor device is switched off and the second transistor device is conductive.

2. A circuit device according to claim 1, characterized in that the first and second transistor devices are each constituted by a pair of bipolar transistors in a Darlington configuration.

3. A circuit device according to claim 1 or claim 2, characterized in that the third and fourth transistor devices are each constituted by a field-effect transistor.

4. A circuit device according to claim 3, characterized by the fact that the two field-effect transistors are identical and by the fact that the first current generator generates a current less than the current of the second current generator.

5. A circuit arrangement according to claim 1 characterized by the fact that the first and second current generators each comprise a pair of bipolar transistors connected in current mirror configuration and a respective current generator.

6. A circuit for providing a supply voltage from a telephone exchange having first an d second supply wires to a user's telephone with a minimum voltage loss, the circuit comprising:

an operational amplifier having non-inverting and inverting input terminals coupled to the first supply wire through the first and second resistances, respectively, and a differential output terminal producing an output voltage signal proportional to the difference between the voltage signals of said first and second input terminals;

a current generator coupled between said first resistance and the second supply wire to generate a current;

a first output transistor coupled to a capacitor and said second resistance and controlled by a first control current, said capacitor being coupled to the circuit output to produce a voltage for the user's telephone;

a second output transistor coupled to the second supply wire and said second resistance and controlled by a second control current;

first and second constant current generators coupled to said second resistance and producing first and second constant currents, said second constant current being greater than said first constant current; and first and second identical control transistors, controlled by said output voltage signal and coupled to said first and second constant current generators, respectively, said first and second control transistors each conducting an identical current from said first and second constant current generators to the second supply wire, wherein a node coupling said first constant current generator to said first control transistor also produces said first control current, wherein a node coupling said second constant current generator to said second control transistor also produces said second control current, whereby said first output transistor is conducting and said second output transistor is cutoff when the voltage on the first supply wire is above a predetermined threshold, and said first output transistor is cutoff and said second output transistor is conducting when the voltage on the first supply wire is below said predetermined threshold.

7. The circuit of claim 6 wherein said second constant current has a value equal to the sum of said first constant current and the maximum value for said first control current.

8. The circuit of claim 6 wherein said first output transistor operates in a linear mode of operation if the voltage on the first supply wire is above a second threshold.

9. The circuit of claim 6 wherein said capacitor charges with a current whose value is determined by the ratio between said first and second resistances.

10. The circuit of claim 8 wherein said first output transistor operates in a saturated mode of operation if the voltage on the first supply wire is below said second threshold.

11. The circuit of claim 10 wherein said capacitor charges with a current determined by the current conducted by said first output transistor and is proportional to the ratio between said first and second resistors.

12. The circuit of claim 6 wherein said first and second output transistors are bipolar transistors.

13. The circuit of claim 6 wherein said first and second output transistors are Darlington transistors.

14. The circuit of claim 6 wherein said first and second control transistors are identical field-effect transistors.

15. A circuit for providing a supply voltage from a telephone exchange having first and second supply wires to a user's telephone with a minimum voltage loss, the circuit comprising:

an operational amplifier having non-inverting and inverting input terminals coupled to the first supply wire through first and second resistances, respectively, and a differential output terminal producing an output voltage signal proportional to the difference between the voltage signals of said first and second input terminals;

a current generator coupled between said first resistance and the second supply wire to generate a current;

a first output transistor coupled to a capacitor and said second resistance and controlled by a first control current, said capacitor being coupled to the circuit output to produce a voltage for the user's telephone;

a second output transistor coupled to the second supply wire and said second resistance and controlled by a second control current;

first and second constant current generators coupled to said second resistance and producing first and second constant currents having an equal value;

a first control transistor, controlled by said output voltage signal and coupled said first constant current generator, said first control transistor conducting a first current from said first constant current generators to the second supply wire, the node coupling said first constant current generator to said first control transistor also producing said first control current; and a second control transistor, controlled by said output voltage signal and coupled said second constant current generator, said second control transistor conducting a second control current from said second constant current generator to the second supply wire, the node coupling said second constant current generator to sad second control transistor also producing said second control current, said second current being greater than said first current, whereby said first output transistor is conducting and said second output transistor is cutoff if the voltage on the first supply wire is above a predetermined threshold, and said first output transistor is cutoff and said second output transistor is conducting if the voltage on the first supply wire is below said predetermined threshold.

16. The circuit of claim 15 wherein said second constant current has a value equal to the sum of said first constant current and the maximum value for said first control current.

17. The circuit of claim 15 wherein said first output transistor operates in a liner mode of operation if the voltage on the first supply wire is above a second threshold.

18. The circuit of claim 15 wherein said capacitor charges with a current whose value is determined by the ratio between said first and second resistances.

19. The circuit of claim 17 wherein said first output transistor operates in a saturated mode of operation if the voltage on the first supply wire is below said second threshold.

20. The circuit of claim 19 wherein said capacitor charges with a current determined by the current conducted by said first output transistor and is proportional to the ratio between said first and second resistors.

* * * * *

UNITED STATES PATENT AND TRADEMARK OFFICE
CERTIFICATE OF CORRECTION

PATENT NO. : 5,337,355

DATED : August 9, 1994

INVENTOR(S) : Luciano Tomasini and Rinaldo Castello

It is certified that error appears in the above-identified patent and that said Letters Patent is hereby corrected as shown below:

In column 5, claim 6, line 51, please delete "an d" and substitute therefor --and--.

In column 7, claim 15, line 26, please delete "sad" and subsitute therefor --said--.

In column 8, claim 17, line 13, please delete "liner" and substitute therefor --linear--.

Signed and Sealed this

Eighteenth Day of October, 1994

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,337,355
DATED     : Aug. 9, 1994
INVENTOR(S) : Luciano Tomasini and Rinaldo Castello It is certified that error appears in the above-indentified patent and that said Letters Patent is hereby corrected as shown below:

On the Title Page, insert the following information:

--[30]     Foreign Application Priority Data
    Dec. 17, 1991  [IT]  Italy................MI91A003376--

Signed and Sealed this

Twenty-eight Day of February, 1995

Attest:

BRUCE LEHMAN

*Attesting Officer*          *Commissioner of Patents and Trademarks*